United States Patent [19]

Itou

[11] Patent Number: 5,088,293
[45] Date of Patent: Feb. 18, 1992

[54] VACUUM COOLING METHOD AND APPARATUS

[75] Inventor: Shunji Itou, Hokkaido, Japan

[73] Assignee: The Japan Steel Works, Ltd., Tokyo, Japan

[21] Appl. No.: 574,859

[22] Filed: Aug. 30, 1990

[51] Int. Cl.⁵ .................. F25B 19/00; A23B 3/00
[52] U.S. Cl. .................................. 62/100; 62/268; 99/472; 34/92
[58] Field of Search ............. 62/119, 100, 268, 270, 62/441, 442; 99/472

[56] References Cited

U.S. PATENT DOCUMENTS

| Re. 31,513 | 1/1984 | Glen | 426/521 |
|---|---|---|---|
| 2,064,678 | 12/1936 | Morgan | 99/472 |
| 2,554,560 | 5/1951 | Craig | 62/268 |
| 3,128,606 | 4/1964 | Watson | 62/100 |
| 3,529,532 | 9/1970 | Reznik et al. | 99/472 |
| 3,643,586 | 12/1972 | Robinson | 53/510 |
| 3,759,166 | 9/1973 | Trandin et al. | 99/472 |
| 4,204,408 | 5/1980 | Dawson | 62/268 |
| 4,368,625 | 1/1983 | Platt | 62/441 |

FOREIGN PATENT DOCUMENTS

| 397101 | 11/1990 | European Pat. Off. |
| 775107 | 5/1957 | United Kingdom |

OTHER PUBLICATIONS

European Search Report.

Patent Abstracts of Japan, vol. 12, No. 128, Apr. 20, 1988, JP-A-62 248477.

Primary Examiner—Albert J. Makay
Assistant Examiner—William C. Doerrler
Attorney, Agent, or Firm—Sughrue, Mion, Zinn Macpeak & Seas

[57] ABSTRACT

In a vacuum cooling apparatus, a hollow receptacle is provided, for containing a plurality of containers for containing materials to be cooled, the containers being slidably fitted in the receptacle one after another. The receptacle has through-holes formed therein at intervals corresponding to the dimension of the container which is measured in the axial direction of the receptacle in such a manner that the receptacle through-holes are arranged in the axial direction of the receptacle. Each of the containers has a container through-hole formed therein so that the container through-hole is allowed to communicate with the receptacle through-holes. Seal members also are provided, allowing the inside of each container to communicate with the outside only through the receptacle through-hole and container through hole. A depressing unit inserts the containers into the receptacle from one end, and vacuum source units, coupled to a series of ones of the cylinder through-holes closest to the depressing unit, provide progressive stages of evacuation to cool food in the containers.

8 Claims, 6 Drawing Sheets

VACUUM COOLING METHOD AND APPARATUS

BACKGROUND OF THE INVENTION

This invention relates to a vacuum cooling method in which food or the like is cooled by decreasing pressure, and to an apparatus for practicing the method (hereinafter referred to as a vacuum cooling apparatus, when applicable).

A vacuum cooling apparatus is used generally for cooling heated and processed foodstuffs. Foodstuffs to be cooled are put in a container. Under this condition, when the container is evacuated, the water in the foodstuffs boils because its boiling point is decreased by the evacuation of the container. The boiling of the water removes the heat in the foodstuffs, thus decreasing the temperature of the foodstuffs. This cooling action also occurs inside the foodstuffs. Therefore, the vacuum cooling apparatus cools food more quickly than a ventilation type cooling apparatus, for example. Further, the vacuum cooling apparatus is very sanitary because air goes into the container only when the container is opened to release the vacuum.

Previously, the vacuum cooling apparatus has been operated in a batchwise fashion. That is, foodstuffs are put in a container, and the container is evacuated to a predetermined degree. After the foodstuffs are cooled as required, the container is opened and the foodstuffs are removed.

The above-described vacuum cooling apparatus has the following disadvantage. With the vacuum cooling apparatus, it is impossible to process foodstuffs successively without wasting time. For instance, when providing frozen vegetables, the vegetables first are subjected to pretreatment such as washing, and then are peeled and cut, and finally are cooked. The cooked vegetables are cooled, frozen, and packed. In order to cool the foodstuffs, the batchwise vacuum cooling apparatus is used, so that the food manufacturing operation is suspended from time to time. That is, it is necessary to hold the foodstuffs temporarily until they are processed with the vacuum cooling apparatus. In this case the waiting time is variable. The foodstuffs cooked earlier have a longer waiting time before they are cooled with the apparatus, so that they are held at high temperature for a long time. Extended high temperatures are not good for sanitation. In addition, because of the variable waiting time, the processed foodstuffs are variable in quality.

SUMMARY OF THE INVENTION

Accordingly, an object of the present invention is to eliminate the above-described difficulties.

This invention has solved the above-described problems by moving containers containing materials to be cooled in stepwise fashion in a cylinder, so as to increase the degree of vacuum of each of the containers in stepwise fashion.

In a vacuum cooling method according to the invention, materials to be cooled are put in a plurality of containers for containing materials to be cooled. The containers are inserted successively into a hollow cylinder from one end. The degrees of vacuum in the containers then are increased by vacuum source units coupled thereto through a plurality of through-holes formed in the cylinder in the axial direction thereof and through-holes formed in the containers, thereby to cool the materials in the containers. Then, the containers are taken out of the cylinder from the other end one after another after being released from evacuation.

The inventive vacuum cooling apparatus is provided with a hollow cylinder (10) and a plurality of containers (14) for containing materials to be cooled, the containers being slidably fitted in the cylinders one after another. The cylinder has cylinder through-holes (22, 24, 26, 28 and 30) formed therein at intervals corresponding to the dimension of the container, and measured in the axial direction of the cylinder in such a manner that the cylinder through-holes are arranged in the axial direction of the cylinder. Each of the containers has a container through-hole (16) formed therein in such a manner that the container through-hole is allowed to communicate with the cylinder through-holes. Seal members (18, 20) allow the inside of each container to communicate with the outside only through the cylinder through-hole and container through hole. A depressor (56) is used to insert the containers into the cylinder from one end. Vacuum source units (40, 42, 44 and 46) are coupled to a series of ones (22, 24, 26 and 28) of the cylinder through-holes closest to the depressing means.

A vacuum cooling apparatus according to another aspect of the invention is provided with a hollow circular cylinder (10) which is disposed vertically. A plurality of containers (14) contain materials to be cooled. The containers are in the form of a bottomed cylinder, and are slidably fitted in the hollow circular cylinder one after another. The hollow circular cylinder has cylinder through-holes (22, 24, 26, 28 and 30) formed therein at intervals corresponding to the dimension of the container as measured in the axial direction thereof, such that the cylinder through-holes are arranged in the axial direction of the cylinder. Each of the containers has a container through-hole (16) formed in the cylindrical wall thereof. Annular seal members (18 and 20) are arranged above and below the container through-hole of each of the containers. A depressor (56) inserts the containers into the cylinder from above. A container receiver (13) receives the containers which are pushed out of the cylinder from below. Vacuum source units (40, 42, 44 and 46) are coupled to the cylinder through-holes other than the ones closer to the lower end of the cylinder.

In the above description, the numerals in parentheses corresponds to those which are used in the following detailed description.

The containers are inserted into the cylinder by the depressor one after another, and are held in gas-tight fashion by means of the seal members in the cylinder. The containers thus held are evacuated through the container through-holes and the cylinder through-holes, so that the degree of vacuum of each container is increased to a predetermined value as it is moved in the cylinder. Thus, food in the container is cooled to a predetermined temperature. Finally, the container reaches the cylinder through-hole, to which no vacuum source unit is connected, so that the pressure in the container is restored to atmospheric pressure. Thereafter, the container is removed from the cylinder, and is delivered to the following processing station. Thus, the food in the containers can be cooled successively at time intervals corresponding to the time required to put the containers in the cylinder and to take them out of the container, and the time required for evacuating the containers.

DETAILED DESCRIPTION OF THE PREFERRED EMBODIMENTS

Figure 1:
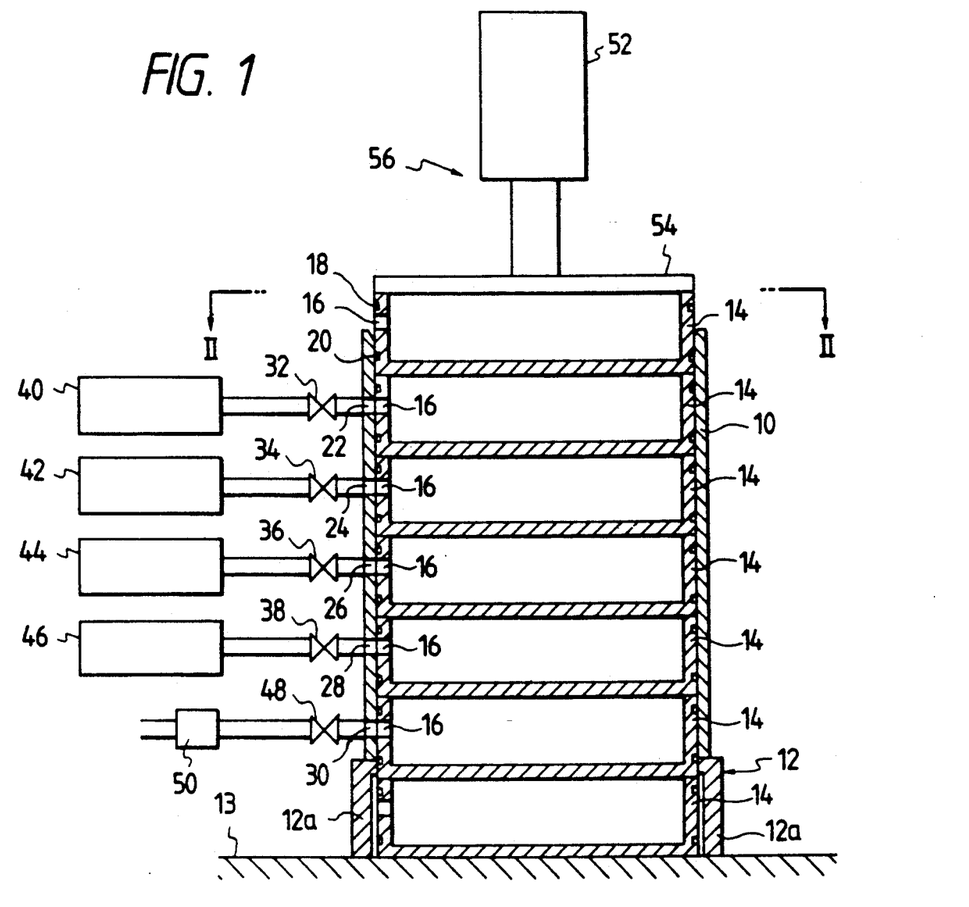
FIG. 1 is a diagram showing a vacuum cooling apparatus according to one embodiment of this invention.
Figure 2:
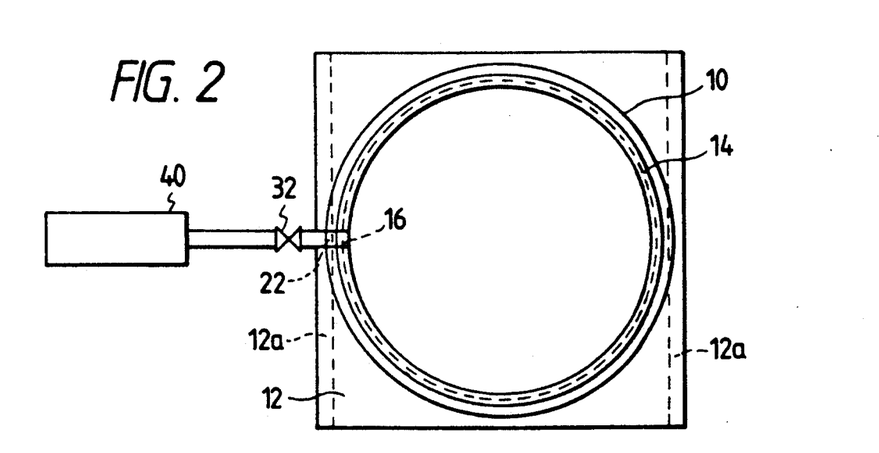
FIG. 2 is a diagram as viewed in the direction of the arrow II—II in FIG. 1.
Figure 3A:
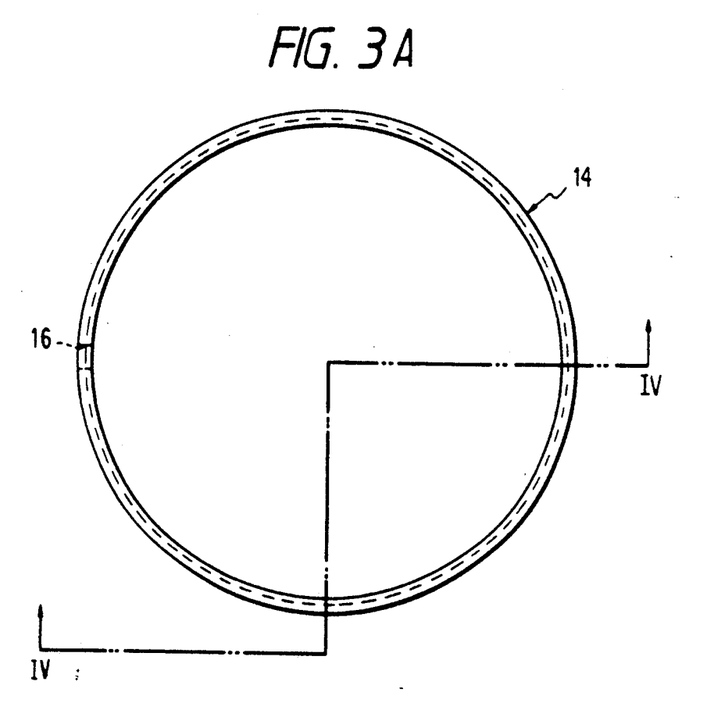
FIGS. 3A-3D are plan views of four examples of containers to be cooled.
Figure 3B:
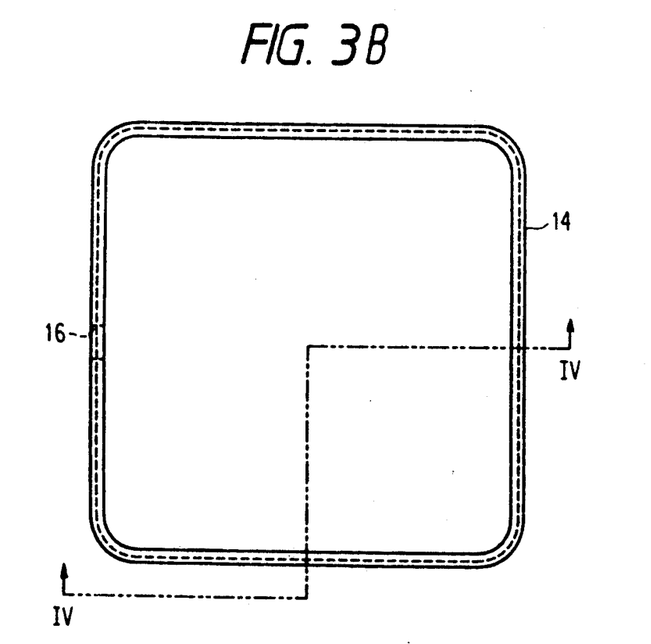
Figure 3C:
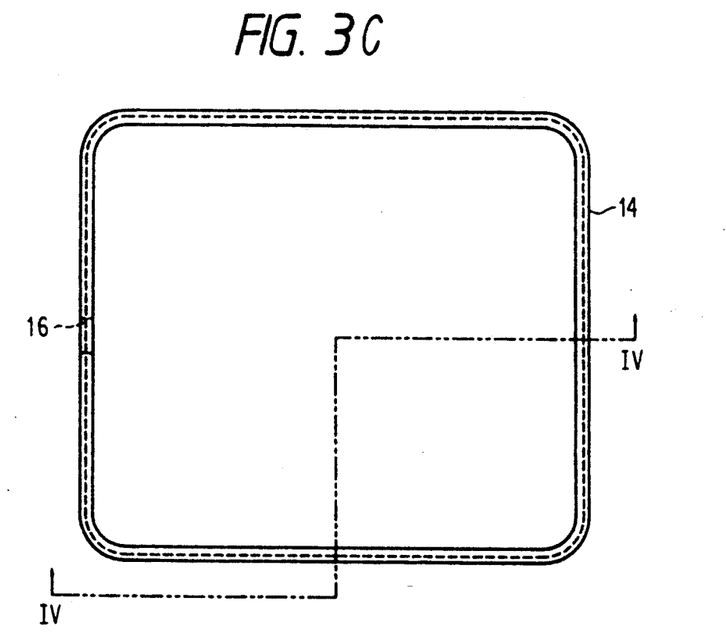
Figure 3D:
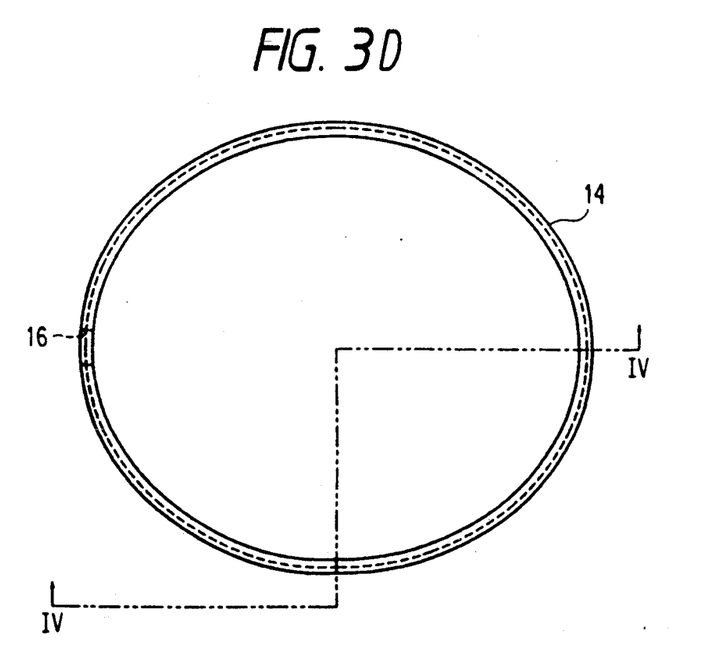
Figure 4A:
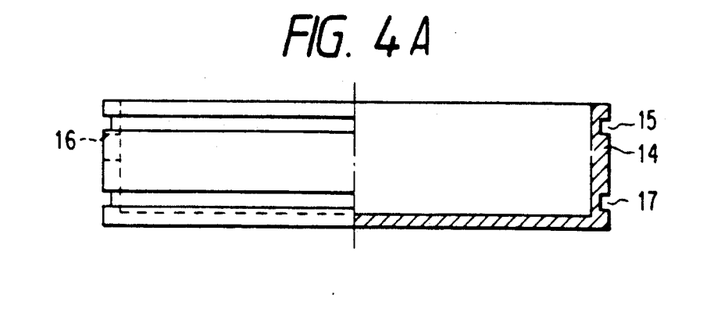
FIGS. 4A-4D are diagrams, viewed in the direction of respective arrows IV—IV in FIGS. 3A-3D.
Figure 4B:
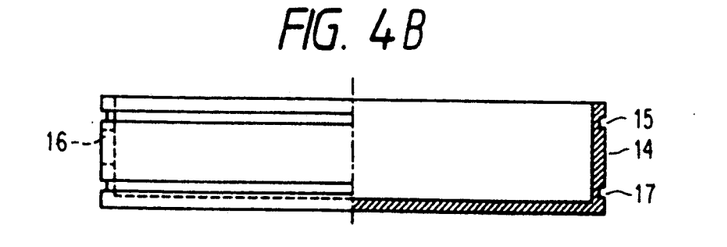
Figure 4C:
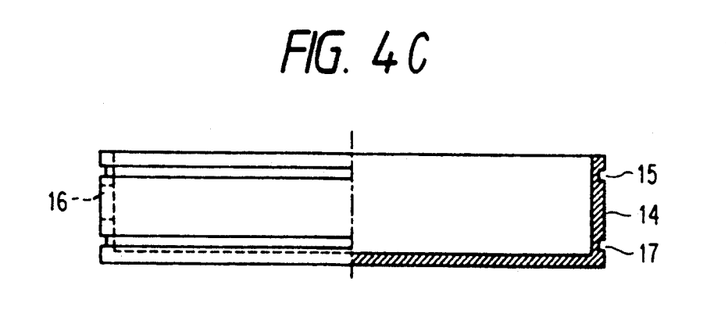
Figure 4D:
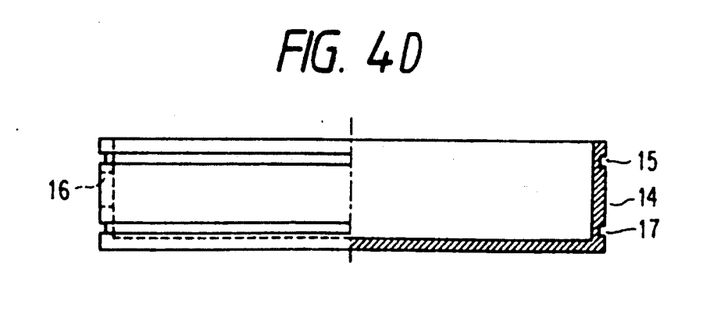

One embodiment of the invention is shown in FIGS. 1 through 4. As shown in FIGS. 1 and 2, a cylinder 10 is mounted fixedly on a stand 12 so as to extend vertically. The stand 12 is placed fixedly on a bed 13, and has a pair of parallel legs 12a on opposite sides thereof whose interior width is larger than the inside diameter of the cylinder 10. The stand 12 is open at upper and lower sides thereof, as seen in FIG. 2. Containers 14 for containing materials to be cooled are stacked in the cylinder 10 and between the legs 12a of the stand 12. The height of the legs 12a is substantially equal to the height of each container 14.

As shown in FIGS. 3A-3D and 4A-4D, the container 14 is in the form of a bottomed cylinder whose outside diameter corresponds to the inside diameter of the cylinder 10, so as to fit in the cylinder 10. The container 14 has a through-hole 16 in the cylindrical wall, and annular grooves 15, 17 (FIGS. 4A-4D) formed respectively above and below the through-hole 16. Seal members 18, 20 are fitted in the annular grooves 15, 17, respectively (FIG. 1).

The cylinder 10 has through-holes 22, 24, 26, 28 and 30 in the cylindrical wall, formed at predetermined equal intervals such that the through-holes are in a vertical line. The distance between these through-holes is equal to the distance between the through-holes 16 of two stacked containers 14 (which in turn is equal to the height of the container 14).

The through-holes 22, 24, 26 and 28 are connected through valves 32, 34, 36 and 38 to vacuum source units 40, 42, 44 and 46, respectively. Each of the vacuum source units 40, 42, 44 and 46 is constituted by a vacuum pump and a vacuum tank. The degrees of vacuum in these units are set so as to be progressively higher, in the stated order. More specifically, the degree of vacuum of the vacuum source unit 40 is 0.3 kg/cm², that of the vacuum source unit 42 is 0.1 kg/cm², that of the vacuum source unit 44 is 0.03 kg/cm², and that of the vacuum source unit 46 is 0.01 kg/cm². The lowermost through-holes 30 of the cylinder 10 communicate through a valve 48 and a filter 50 with the open air.

A depressing unit 56, which is made up of an air cylinder 52 and a depressing board 54 which is operated by the air cylinder 52, is provided above the cylinder 10. The depressing board 54 of the depressing unit 56 is placed on the containers 14 to push the containers downwardly.

The operation of the foregoing embodiment now will be described. Food to be cooled is put in the containers 14 shown in FIG. 1. The second container 14 from top is evacuated by the vacuum source unit 40 to 0.3 kg/cm². Each of the containers 14 has an open top, as was described before; however, it is sealed by the seal member 20 of the container 14 placed on it. Hence, all the containers 14 except the top container are held gas-tight. Similarly, the third, fourth and fifth containers 14 are evacuated to 0.1 kg/cm², 0.03 kg/cm² and 0.01 kg/cm², respectively.

The sixth container 14 (the second one from bottom) is exposed to open air through the filter 50 and the valve 48; that is, the air pressure in the sixth container is atmospheric pressure. The air pressure in the sixth container 14 is increased gradually by closing the valve 48, so that the foodstuffs are prevented from being scattered by the suction air.

When the pressures in the second through fifth containers 14 are set to the above-described values by the vacuum source units 40, 42, 44 and 46, respectively, the valves 32, 34, 36, 38 and 48 are closed. The bottom container 14, the seventh container on the bed 13, can be removed from the stand 12 by being pushed in a direction perpendicular to the drawing. Even when the bottom container has been removed from the stand 12, the remaining containers 14 except for the sixth container (the second one from bottom) will not drop because of friction with the inner wall cylinder 10. Under this condition, another container 14 is placed on the top container 14, and seven containers are moved downwardly with the depressing unit 56 by an amount equal to the height of one container. Thus, the containers are placed as shown in FIG. 1.

Under this condition, the valves 32, 34, 36, 38 and 48 are opened, so that the second, third, fourth and fifth containers 14 are evacuated with the vacuum source units 40, 42, 44 and 46 to the predetermined degrees of vacuum, respectively, while the pressure in the sixth container (second one from bottom) is restored to atmospheric pressure. The bottom container 14 is removed similarly as in the above-described case. Thereafter, the above-described operations are carried out repeatedly.

Figure 5:
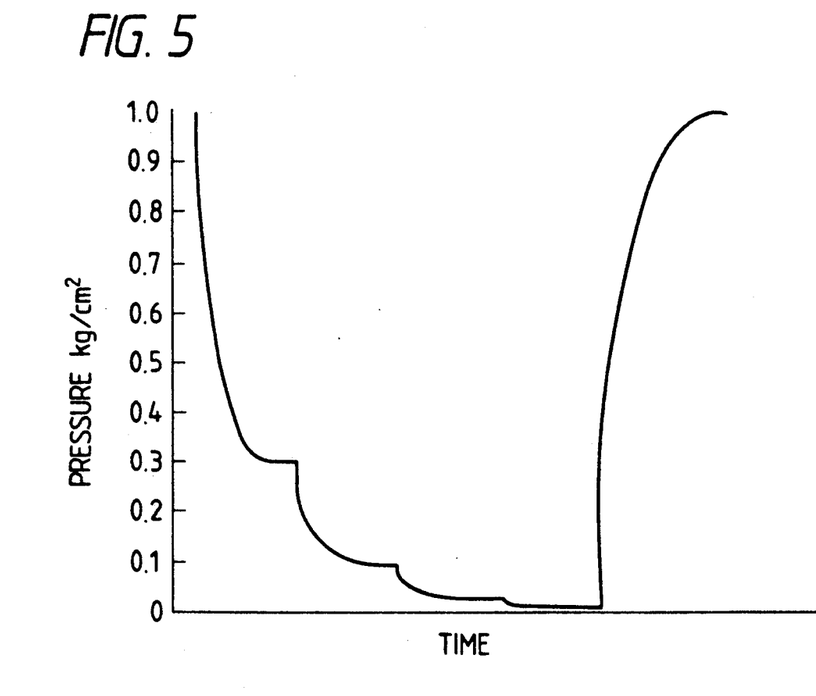
FIG. 5 is a graphical representation indicating variation of the pressure in the container as a function of time.

Now, consider the variation of the pressure in one container. As the one container is moved down the cylinder in stepwise fashion, its degree of vacuum is increased in stepwise fashion. When the degree of vacuum finally reaches 0.01 kg/cm², the pressure in the container is restored to atmospheric pressure. That is, the pressure in the container changes as indicated in FIG. 5.

By carrying out the above-described operations repeatedly, the containers 14, cooled as required, are supplied one after another at certain time intervals. If the number of containers 14 to be stacked is increased, and the time required for evacuation of the containers is decreased, then the containers can be supplied at shorter time intervals. Theoretically, the container supplying time interval can be reduced to the time required for the container to be put into and taken out of the apparatus. That is, with the vacuum cooling apparatus, foodstuffs can be coded cyclically and successively. Hence, where the vacuum cooling apparatus is used, for instance, in a production line for automatically processing vegetables to provide frozen vegetables, the foodstuffs cooked at high temperature can be cooled without delay. Thus, they are handled sanitarily, thus contributing to improved quality thereof.

Figure 6:
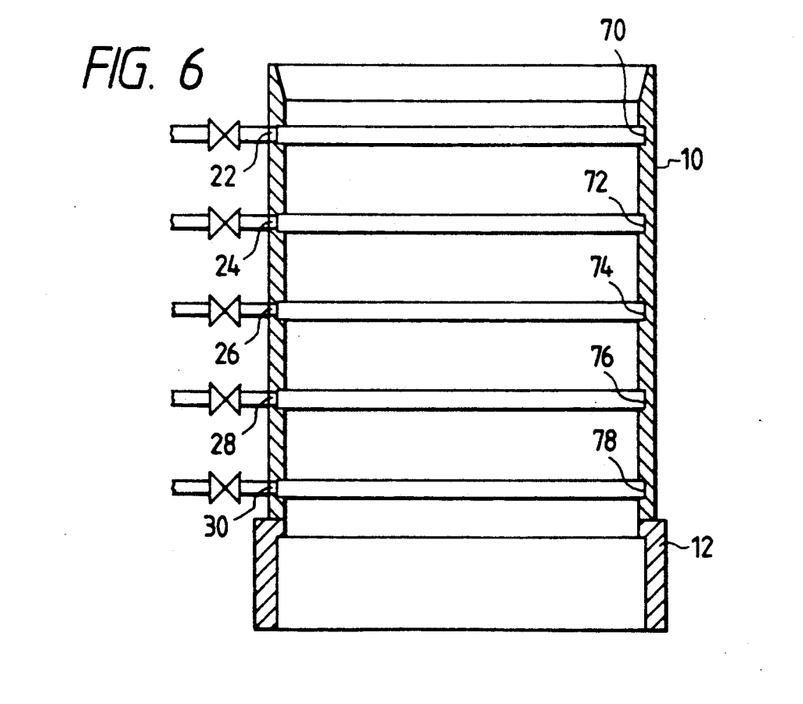
FIG. 6 is a diagram showing a cylinder different from that which is shown in FIG. 1.
Figure 7:
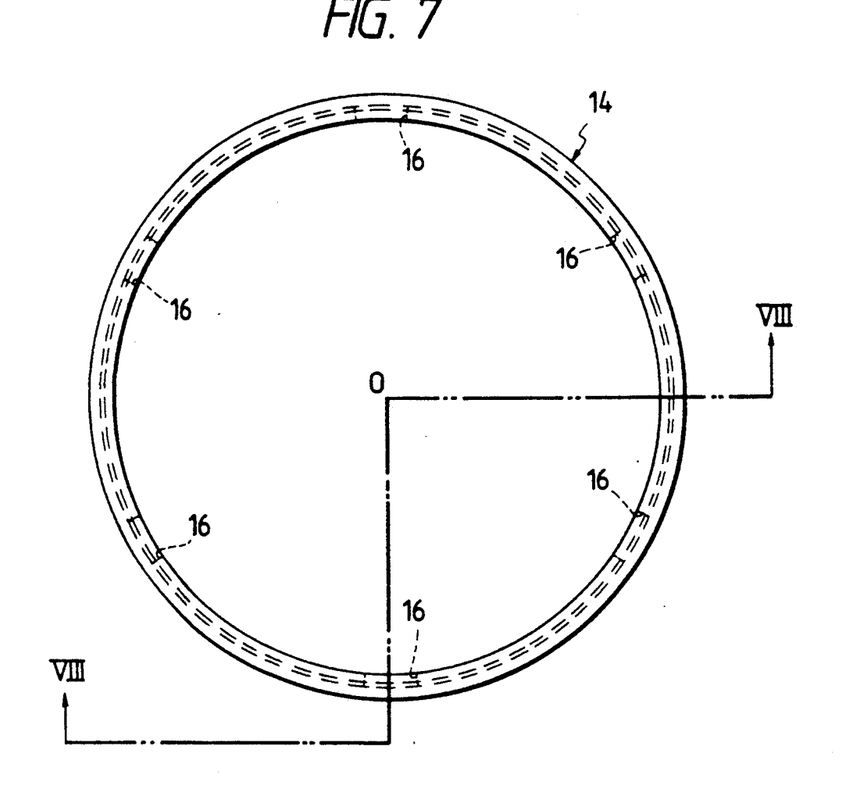
FIG. 7 is a diagram showing another example of the container.
Figure 8:
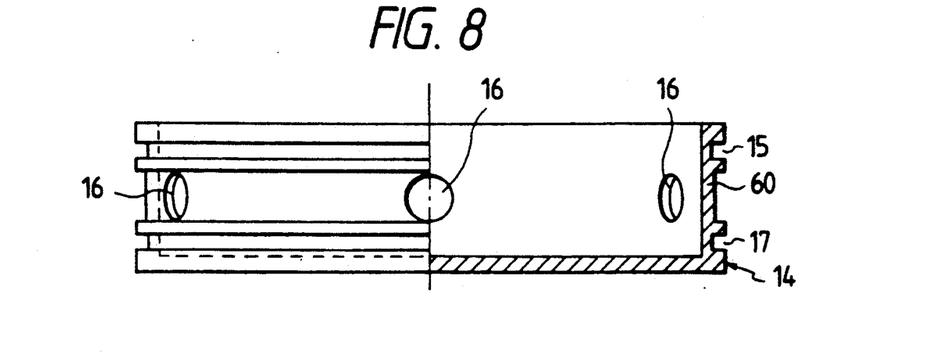
FIG. 8 is a diagram viewed in the direction of the arrow VIII—VIII in FIG. 7.

In the above-described embodiment, it is necessary to place the containers 14 so that the through-holes 22 through 30 of the cylinder 10 are aligned with the through-holes 16 of the containers 14. However, the alignment may be eliminated by modifying the cylinder 10 as shown in FIG. 6, or in FIGS. 7 and 8. In FIG. 6, annular grooves 70, 72, 74, 76 and 78 are formed in the inner wall of the cylinder 10 so as to communicate with the through-holes 22, 24, 26, 28 and 30, respectively. In FIGS. 7 and 8, an annular groove 60 is formed in the outer wall of the container 14 so as to communicate with the through-holes 16 of the container 14 (six through-holes 16 being formed in the case of FIGS. 7 and 8).

In the above-described embodiment, the cylinder 10 and the containers 14 are, of course, cylindrical; however, the invention is not limited thereto. For instance, they may be square, or rectangular, or even elliptical. Further, in the embodiment, the top end of each container 14 is open; however, the container may be in the form of a box with a top cover. The apparatus also may be so modified that the containers 14 are moved upwardly in the cylinder 10, with the depressor unit at the bottom. In addition, the cylinder 10 may be laid horizontally. Furthermore, in the embodiment, the container 14 is pushed out of the cylinder 10 onto the surface of the bed 13; however, it may be designed to receive by a conveyor or movable table. Still further, in the embodiment, the bottom container 14 serves as a stopper to position the remaining containers 14, or to prevent them from dropping. Instead of the stopper, a movable stopper such as a lever or pin may be employed. Moreover, the depressing unit 56 may be replaced with a device with an electric motor which operates with suitable stroke, force and speed for depression of the containers 14.

As described above, in the vacuum cooling apparatus of the invention, the containers are moved stepwise in the cylinder so as to be evacuated in stepwise fashion. Hence, with the apparatus, for instance foodstuffs can be cooled successively. Thus, foodstuffs or the like are not left at high temperature for a long time, and accordingly sanitation is improved, and quality stabilized. In addition, automation of the production line can be achieved readily. Means for providing predetermined degrees of vacuum with high efficiency can be utilized as the vacuum source units to improve the material processing efficiency. By setting the cylinder vertically, the space occupied by the apparatus can be reduced correspondingly.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. A vacuum cooling method comprising the steps of:
putting heated foodstuffs in a plurality of containers;
inserting said containers into a hollow receptacle from one end thereof;
increasing the degrees of vacuum in said containers by vacuum source units coupled thereto through a plurality of through-holes, formed in said receptacle in an axial direction thereof, and corresponding through-holes formed in said containers, thereby to cool said foodstuffs in said containers in stepwise fashion by providing a progressively higher degree of vacuum at each of said vacuum source units; and
taking said containers out of said receptacle from the other end, one after another, as each said container is released from evacuation.

2. A method as claimed in claim 1, wherein said receptacle has a circular cross-section.

3. A method as claimed in claim 1, wherein said receptacle has a square cross-section.

4. A method as claimed in claim 1, wherein said receptacle has a rectangular cross-section.

5. A method as claimed in claim 1, wherein said receptacle has a elliptical cross-section.

6. A vacuum cooling apparatus comprising:
a hollow receptacle;
a plurality of containers for containing heated foodstuffs, said containers being slidably fitted in said receptacle one after another;
said receptacle having through-holes formed therein at intervals corresponding to a dimension of said container which is measured in the axial direction of said receptacle such that said receptacle through-holes are arranged in the axial direction of said receptacle;
each of said containers having a container through-hole formed therein in such a manner that said container through-hole is allowed to communicate with said receptacle through-holes;
seal members allowing an inside of each container to communicate with the outside only through said receptacle through-hole and container through-hole;
depressing means for inserting said containers into said receptacle from one end; and
vacuum source units each coupled to a respective individual one of said receptacle through-holes at increasing distances from said depressing means, for cooling said foodstuffs in said containers in stepwise fashion in said receptacle by having each of said vacuum source units provided a progressively higher degree of vacuum.

7. An apparatus as claimed in claim 6, further comprising a filter and a valve at a receptacle through-hole most distant from said depressing means, wherein a container in said receptacle most distant from said depressing means is exposed to atmospheric pressure.

8. A vacuum cooling apparatus comprising:
a hollow circular cylinder disposed vertically;
a plurality of containers for containing heated foodstuffs, said containers being in the form of a bottomed cylinder and being slidably fitted in said cylinder one after another;
said cylinder having cylinder through-holes formed therein at intervals corresponding to the dimension of said container which is measured in the axial direction of said cylinder in such a manner that said cylinder through-holes are arranged in the axial direction of said cylinder;
each of said containers having a container through-hole formed in the cylindrical wall thereof;
annular seal members arranged above and below said container through-hole of each of said containers;
depressing means for inserting said containers into said cylinder from above;

container receiving means for receiving said containers which are pushed out of said cylinder from below; and a plurality of vacuum source units, each coupled to a respective individual one of said cylinder throughholes at increasing distances from said depressing means and provided for cooling said foodstuffs in said containers in stepwise fashion by providing a progressively higher degree of vacuum at each of said vacuum source units.

* * * * *